US008031068B1

(12) United States Patent
Steadman et al.

(10) Patent No.: US 8,031,068 B1
(45) Date of Patent: *Oct. 4, 2011

(54) SYSTEM AND METHOD FOR DETECTING EMPLACEMENT OF IMPROVISED EXPLOSIVE DEVICES

(75) Inventors: Robert L. Steadman, Mansfield, MA (US); James Fitzgerald, Westford, MA (US)

(73) Assignee: Textron Systems Corporation, Wilmington, MA (US)

( * ) Notice: Subject to any disclaimer, the term of this patent is extended or adjusted under 35 U.S.C. 154(b) by 988 days.

This patent is subject to a terminal disclaimer.

(21) Appl. No.: 11/697,899

(22) Filed: Apr. 9, 2007

Related U.S. Application Data

(63) Continuation of application No. 11/312,083, filed on Dec. 20, 2005, now abandoned.

(60) Provisional application No. 60/749,974, filed on Dec. 13, 2005.

(51) Int. Cl.
*G08B 1/08* (2006.01)
*G08B 13/14* (2006.01)
*H04Q 5/22* (2006.01)
*H04W 4/00* (2009.01)
*H04L 12/28* (2006.01)

(52) U.S. Cl. ........... 340/539.22; 340/539.26; 340/572.8; 340/10.42; 340/545.4; 370/338; 370/351; 370/328

(58) Field of Classification Search ............. 340/539.22, 340/539.26
See application file for complete search history.

(56) References Cited

U.S. PATENT DOCUMENTS

| 3,914,732 | A | * | 10/1975 | Brumleve et al. ............. 367/197 |
| 3,949,353 | A | | 4/1976 | Waters et al. |
| 4,152,691 | A | | 5/1979 | Ward |
| 5,969,608 | A | | 10/1999 | Sojdehei et al. |
| 6,057,549 | A | | 5/2000 | Castleman |
| 6,208,247 | B1 | * | 3/2001 | Agre et al. ............... 340/539.19 |
| 6,359,582 | B1 | | 3/2002 | MacAleese et al. |

(Continued)

FOREIGN PATENT DOCUMENTS

GB  002112144  A  *  7/1983

OTHER PUBLICATIONS

Poor, "Wireless Mesh Networks," Feb. 1, 2003, Ember Corp., pp. 1-5.

(Continued)

*Primary Examiner* — Jennifer Mehmood
*Assistant Examiner* — Fekadeselassie Girma
(74) *Attorney, Agent, or Firm* — BainwoodHuang

(57) ABSTRACT

An explosive device detection system includes sensors and base station that detect and report on suspected Improvised Explosive Devices (IED) or landmine emplacement activity within a geographic area. When disposed within a geographic area, each sensor forms part of a wireless communications network which allows communication among neighboring sensors. As a sensor detects activity in its proximity, such as activity that indicates emplacement of an IED, the sensor transmits a reporting signal through the network to the base station. The neighboring sensors receive and transmit the reporting signal in a sequential manner toward the base station. Because the reporting signal takes multiple hops toward the base station, the sensors do not require large amounts of power to transmit the signal. Furthermore, the detection system allows detection of IED emplacement within the geographic area as the activity occurs. As a result, the base station can direct mobile response units to take immediate responsive action to prevent detonation of the IED's.

15 Claims, 9 Drawing Sheets

U.S. PATENT DOCUMENTS

| | | | |
|---|---|---|---|
| 6,463,387 B1 * | 10/2002 | Runnestrand et al. | 702/16 |
| 6,735,630 B1 * | 5/2004 | Gelvin et al. | 709/224 |
| 6,917,281 B1 | 7/2005 | Goldberg | |
| 6,999,377 B2 * | 2/2006 | Burkholder et al. | 367/63 |
| 7,233,781 B2 | 6/2007 | Hunter et al. | |
| 7,336,079 B2 * | 2/2008 | Stolarczyk et al. | 324/330 |
| 7,375,646 B1 * | 5/2008 | Diaz-Lopez | 340/690 |
| 7,511,654 B1 | 3/2009 | Goldman et al. | |
| 7,512,511 B1 | 3/2009 | Schultz et al. | |
| 7,639,178 B1 | 12/2009 | Mulbrook et al. | |
| 2003/0067542 A1 | 4/2003 | Monroe | |
| 2003/0169335 A1 | 9/2003 | Monroe | |
| 2005/0251343 A1 | 11/2005 | Zehavi | |
| 2006/0095539 A1 * | 5/2006 | Renkis | 709/217 |
| 2006/0229086 A1 * | 10/2006 | Broad et al. | 455/456.1 |
| 2008/0009970 A1 | 1/2008 | Bruemmer | |
| 2008/0122634 A1 | 5/2008 | Mardirossian | |
| 2008/0129495 A1 * | 6/2008 | Hitt | 340/539.26 |
| 2008/0205324 A1 | 8/2008 | Woosnam | |
| 2009/0182525 A1 | 7/2009 | Schultz et al. | |

OTHER PUBLICATIONS 1998-2004 Infoage, "Projects: REMBASS," www.infoage.org/rembass.html, page created Sep. 2, 1998, total pp. 2.

FAS Military Analysis Network, "AN/GSQ-187 Remote Battlefield Sensor System (REMBASS) AN/GSQ-187 Improved Remote Battlefield Sensor System (IREMBASS)," www.fas.org/man/dod-101/sys/land/rembass.htm, pp. 1-6.

U.S. Appl. No. 11/697,884, Entitled "Devices and Method for Detecting Emplacement of Improvised Explosive Devices," filed Apr. 9, 2007 by Robert L. Steadman, James Fitzgerald and Mark Litchfield.

U.S. Appl. No. 11/697,941, Entitled "Base Station and Method for Detecting Emplacement of Improvised Explosive Devices," filed Apr. 9, 2007 by James Fitzgerald and Robert L. Steadman.

* cited by examiner

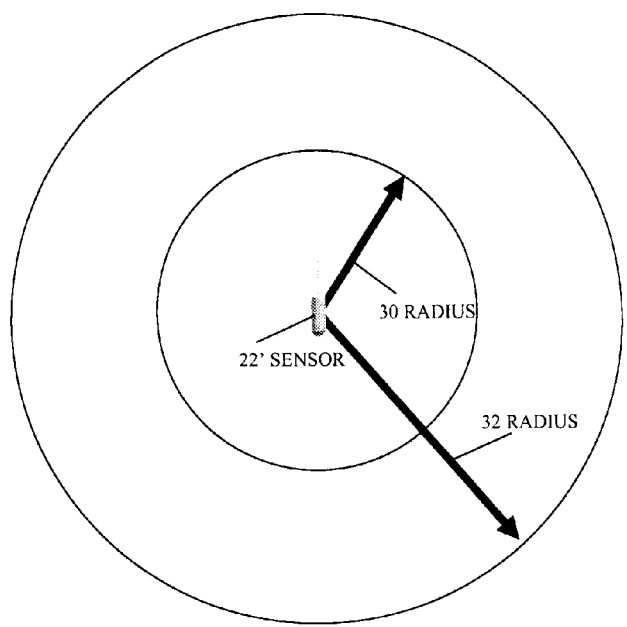
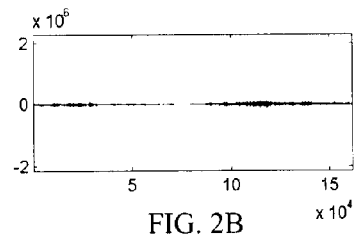
FIG. 2B
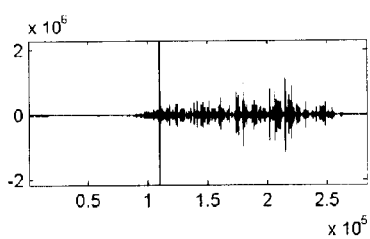
FIG. 2C
FIG. 2A

SYSTEM AND METHOD FOR DETECTING EMPLACEMENT OF IMPROVISED EXPLOSIVE DEVICES

BACKGROUND

Terrorist-type explosives, such as Improvised Explosive Devices or IED's, are a source of casualties both in military action and in peacetime. Certain IED's, such as roadside bombs, are formed of an explosive element, such as one or more 120 mm or 155 mm shells, and a radio controlled detonator. These IED's are placed along side roadways and typically hidden, buried, or camouflaged. In use, when a triggerman observes a target vehicle traveling toward an emplaced IED, the triggerman remotely detonates the IED using a remote control, thereby causing the IED to explode and cause damage to the target vehicle, injury to the vehicle's personnel, or both.

In order to reduce the risk of an attack by way of such roadside IED's, military groups typically focus their efforts toward countering the effect of IED's after emplacement. For example, the military can send personnel and equipment to roadway locations in an attempt to visually detect the presence of IED's. Once detected, the IED's can be cleared from the location. The military also utilizes signal jamming techniques to prevent the triggermen from remotely detonating IED's using the radio controlled detonators. Additionally, the military has added or increased the amount of armor on military vehicles to limit the potentially destructive effects of the IED's on the vehicles and personnel in the event that an IED becomes detonated in the vehicle's vicinity.

The military also utilizes other types of sensor systems to detect movement of personnel and vehicles in a particular area. For example, the Remotely Monitored Battlefield Sensor System (REMBASS) includes remotely monitored sensors placed within a particular geographic location. As personnel enter the area, the sensors detect and locate the personnel within the area and classify the type of personnel, such as wheeled vehicle, tracked vehicle, or pedestrian traffic.

SUMMARY

As described above, the military typically counters IED emplacement efforts after the IED's have been emplaced within a geographic area using different techniques. However, these techniques suffer from a variety of deficiencies. For example, as described above, the military provides personnel to visually detect the presence of IED's. However, the enemy can counter this technique by improving the camouflage of the IED's and increasing the number of IED's emplaced over a particular geographic area. Also in the case where the military utilizes signal jamming techniques to prevent radio controlled detonators from detonating the IED's, the enemy can utilize a hard wire remote control or a motion sensor device, such as passive infrared detector, hard wired to the IED. As a vehicle or personnel moves into the detection range of the motion sensor, the motion sensor transmits a signal to the IED, causing it to detonate. Additionally, while the military has added or increased the amount of armor on military vehicles, detonation of larger IED's, or Explosively Formed Penetrator (EFP) devices, can penetrate the armor plated vehicles and cause damage to the vehicles.

Also as indicated above, the military utilizes sensor systems, such as REMBASS, to detect movement of personnel and vehicles in a particular area. In REMBASS, however, sensors typically transmit motion data to a program monitor upon detection of detect movement within the system. In the case where a REMBASS sensor is located at a relatively large distance away from the program monitor, the sensor require relatively large amounts of power to successfully transmit the motion data to the monitor such data transmissions, thereby increasing the power requirements of the sensor's power supply. Such systems do not discriminate activities associated with the emplacement of IEDs from the ordinary motion of vehicles, personnel, or other innocent signatures.

In contrast to the conventional IED detection approach, embodiments of the invention are directed to techniques for detecting activity associated with placing an explosive device, such as an IED or landmine, within a particular geographic area. A detection system includes sensors and base station that detect and report on suspected IED emplacement activity within the area. When disposed within a geographic area, each sensor forms part of a wireless communications network which allows communication among neighboring sensors. As a sensor detects activity in its proximity, such as activity that indicates emplacement of an IED, the sensor transmits a reporting signal through the network to the base station. The neighboring sensors receive and transmit the reporting signal in a sequential manner toward the base station. Because the reporting signal takes multiple hops to the base station, each sensor transmits signals only to nearby neighboring and, therefore the sensors do not require large amounts of power to transmit the signal. Furthermore, the detection system allows detection of IED emplacement within the geographic area as the activity occurs. As a result, the base station can direct mobile response units to take immediate responsive action to prevent detonation of the IED's or apprehend the perpetrators in the act.

In one arrangement, a system for detecting placement of an explosive device within a geographic area includes a set of sensors forming a communications network and a base station. Each sensor is configured to detect activity within a location proximate to the sensor and to generate a local reporting signal indicating a characteristic of the locally detected activity. Each sensor includes a transceiver configured to (i) receive a remote reporting signal from other sensors of the network, the remote reporting signal indicating a characteristic of the remotely detected activity and (ii) transmit at least one of the local reporting signal and the remote reporting signal to other sensors of the network. The base station is configured to receive at least one of the local reporting signal and the remote reporting signal from the communications network and generate a reporting output based upon the characteristic of the detected activity as indicated by the received reporting signal. Because the sensors both transmit and receive reporting signals, the signals take multiple hops toward the base station. As such, the sensors do not require large amounts of power to transmit the signal.

One embodiment of the invention relates to a method for detecting placement of an explosive device within a geographic area. The method includes in a set of sensors forming a wireless meshed communications network, detecting, by a first sensor, activity within a location proximate to the first sensor. The method also includes generating a local reporting signal indicating a characteristic of the locally detected activity and transmitting the local reporting signal to a base station via at least a second sensor in the wireless meshed communications network. Also, the method includes, in the base station, receiving the local reporting signal and generating a reporting output based upon the characteristic of the detected activity as indicated by the received local reporting signal.

In one arrangement, a system for detecting explosive apparatus emplacement includes a base station and remote seismic sensing devices configured to communicate with the base station in a wireless manner. The remote seismic sensing devices are configured to self-form a wireless communications network having multiple communications pathways from the remote seismic sensing devices to the base station. The base station includes an interface to a user of the system and is configured to identify an explosive apparatus emplacement event to the user via the interface based on seismic information from the remote seismic sensing devices. The base station, in one arrangement, is configured to evaluate predetermined characteristics of the seismic information that tend to distinguish the explosive apparatus emplacement event from other events. In one arrangement, the predetermined characteristics include impulsivity of the detected activity, aperiodicity of the detected activity, amplitude of the detected activity, and concentration of the detected activity at a small number of adjacent sensors.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 2A illustrates a detection range for a sensor of FIG. 1.

FIG. 2B is a graph showing a first type of vibration activity detected by the sensor of FIG. 2A.

FIG. 2C is a graph showing a second type of vibration activity detected by the sensor of FIG. 2A.

FIG. 7C illustrates a top view of the seismic sensor of FIG. 7A.

DETAILED DESCRIPTION

Embodiments of the invention are directed to techniques for detecting placement of an explosive device, such as an IED or landmine, within a particular geographic area. A detection system includes sensors and base station that detect and report on suspected IED emplacement activity within the area. When disposed within a geographic area, each sensor forms part of a wireless communications network which allows communication among neighboring sensors. As a sensor detects activity in its proximity, such as activity that indicates emplacement of an IED, the sensor transmits a reporting signal through the network to the base station. The neighboring sensors receive and transmit the reporting signal in a sequential manner toward the base station. Because the reporting signal takes multiple hops toward the base station, the sensors do not require large amounts of power to transmit the signal. Furthermore, the detection system allows detection of IED emplacement within the geographic area as the activity occurs. As a result, the base station can direct mobile response units to take immediate responsive action to prevent detonation of the IED's.

Figure 1:
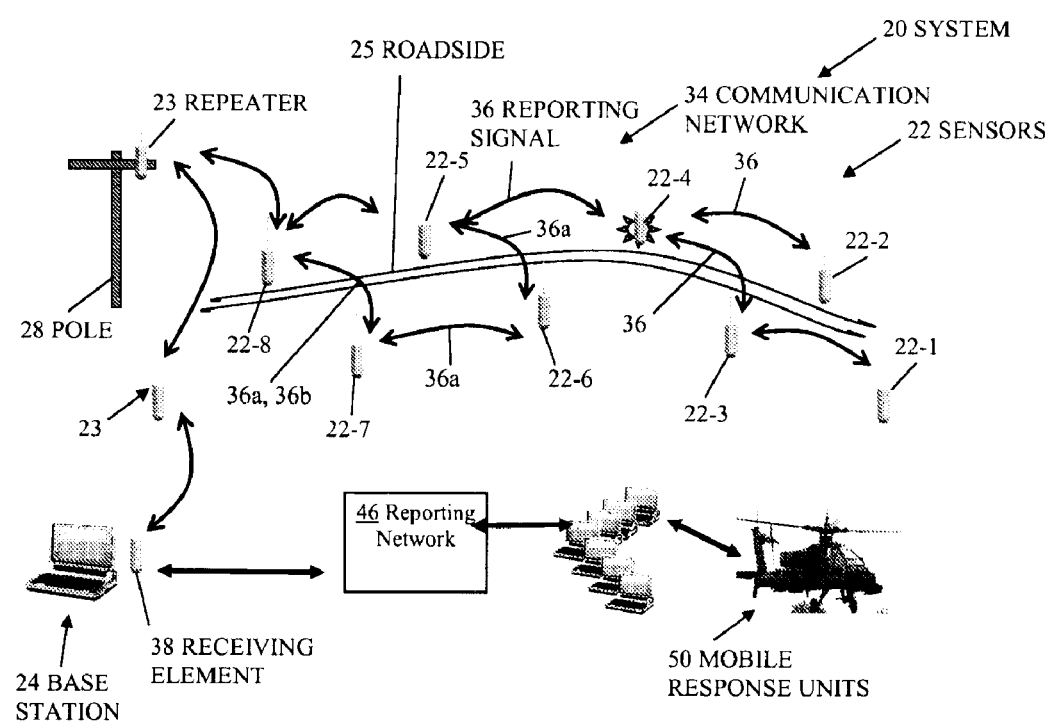
FIG. 1 illustrates a schematic representation of a system for detecting placement of an explosive device within a geographic area.

FIG. 1 illustrates one embodiment of a detection system 20 for detecting placement of an explosive device, such as an IED, within a given geographic area. The detection system 20 includes a set of sensors 22, one or more optional signal repeaters 23, and a base station 24. The system 20 provides substantially continuous monitoring of an area for IED emplacement. For example, the sensors 22 and signal repeaters 23 of the system 20 can be installed within a geographic area, such as along a roadside 25, for surveillance of IED emplacement activity. The base station 24 can be installed within a location remote from the sensors 22 and signal repeaters 23 within the system 20. The system 20 allows reporting of IED emplacement within the geographic area as it occurs. For example, the sensors 22 transmit reporting signals to the base station 24 that can indicate IED placement activity within the area. Based upon the signals, personnel monitoring the base station 24 can direct mobile response units to take responsive action, such as capturing insurgents in the act of emplacement, tracking the insurgents, performing a stake-out at suspected IED sites to apprehend the trigger men, or warning convoys/patrols of suspect locations until the locations are investigated and cleared.

In one arrangement, the sensors 22 are implanted within the ground near a roadside to minimize visual detection of the sensor 22. The sensors 22 can be implanted in the ground using a number of different techniques. For example, personnel can form holes in the ground using an auger mechanism and can manually place the sensors in the holes. Alternately, sensor implantation can be performed automatically by an implantation device that both forms holes in the ground and implants the sensor 22 within the hole. While each sensor 22 can be implanted at any distance from any neighboring sensor, in one arrangement, the sensors 22 are implanted at a distance of between about 25 meters and 100 meters from each other.

In the system 20, each sensor 22 is configured to detect activity within a location in proximity to the sensor 22. In one arrangement, each sensor 22 is configured as a seismic sensor which detects local vibrations within a particular distance from the seismic sensor 22'. For example, as shown in FIGS. 2A-2C, for activity generating vibrations having a relatively small amplitude, such as caused by pedestrians walking as shown in FIG. 2B, the seismic sensor 22' detects such activity within a radius 30 of approximately 25 meters from the seismic sensor 22'. However, for activity that produces vibrations having relatively larger amplitudes, such as caused by emplacement of an IED within the ground as shown in FIG. 2C, the seismic sensor 22' detects such activity within a radius 32 of considerably greater than 25 meters from the seismic sensor 22'.

Each sensor 22 is also configured to generate a local reporting signal indicating a characteristic of the activity detected in proximity to the sensor. For example, when the sensor 22 is configured as a seismic sensor 22', the sensor 22' generates a local reporting signal that indicates a seismic characteristic of a vibration signal detected by the sensor 22'. While the local reporting signal can indicate any number of seismic characteristics of the detected vibration, in one embodiment, the seismic characteristic indicates a peak amplitude of the vibration signal, a signal to noise ratio of the vibration signal, a duration of the vibration signal, statistical analysis or kurtosis of the vibration signal, and a spectral ratio of the vibration signal.

Returning to FIG. 1, the sensors 22 form a wireless communications network 34 that allows the sensors 22 to both send and receive reporting signals, as generated by any of the sensors 22, in order to direct the reporting signals toward the base station 24. For example, each sensor 22 includes a transceiver (not shown) that allows the sensors 22 to transmit and receive wireless reporting signals. In one embodiment, the transceivers are configured with a communications protocol, such as the IEEE 802.15.4 protocol or the ZigBee protocol that defines a relatively inexpensive self-forming, self-healing, multi-hop, mesh network. Such a mesh network forms a "daisy chain" from one sensor 22 to another to expand the relatively short transmission range of one sensor 22 over a relatively larger area and to minimize the amount of power required by the sensor 22 to transmit a signal.

With the sensors 22 forming a wireless mesh communications network 34, each sensor 22 within the communication network 34 acts as a relay point for other neighboring sensors 22 to direct reporting signals toward the base station 24. As such, each sensor 22 transmits the signals to a limited number of sensors 22 within the communications network 34. For example, as shown in FIG. 1, a sensor 22-4 detects activity within its proximity, generates a reporting signal, and transmits the signal 36 to neighboring sensors 22-2, 22-3, and 22-5 disposed within its geographic proximity. Each of the neighboring sensors 22-2, 22-3, and 22-5 receives the signal 36 and, in turn, transmits the signal 36 to other geographically proximate sensors to direct the signal 36 toward the base station 24. For example, the sensor 22-5 transmits the reporting signal 36 to neighboring sensors 22-6, 22-7, 22-8 to direct the signal to the base station 24. Sensor 22-3 would not necessarily transmit the reporting signal 36 to sensor 22-1 because the sensor 22-1 is geographically further away from the base station 24 relative to sensor 22-3. The process of transmission and reception of the reporting signal 36 among neighboring sensors 22 continues until the signal 36 reaches the base station 24.

While the sensors 22 within the network are configured to transmit reporting signals received from other sensors 22 within the network, such signals being termed remote reporting signals, each sensor 22 can also transmit local reporting signals generated by the sensor itself. As a result, the sensors 22 provide the base station 24 with a substantially comprehensive view of the overall activity within a geographic area. For example, assume sensor 22-6 generates a local reporting signal 36a that indicates a locally detected activity. The sensor 22-6 then transmits the local reporting signal 36a to neighboring sensors 22-5 and 22-7. Each sensor 22-5, 22-7 receives the signal as remote reporting signals. In the event that one of the sensors 22-5, 22-7, such as sensor 22-7 for example, also detects local activity and generates a local reporting signal 36b, the sensor 22-7 then transmits its local reporting signal 36b along with the reporting signal 36a received from the sensor 22-6 to a neighboring sensor 22-8. This process repeats until the reporting signal reaches the base station 24.

The system 20 can also include one or more signal repeaters 23 configured to receive and transmit reporting signals from the sensors 22 within the communications network 34 to the base station 24, such as through a wireless communications protocol. In one arrangement, the signal repeaters 23 increase the communication range of the sensors 22 in the network 34 relative to the base station 24. For example, in certain cases, the sensors 22 are disposed with a geographic area having an irregular or hilly terrain that can impede the transmission of reporting signals within the network 34. The signal repeaters 23, such as repeaters 23 elevated above the terrain via a pole 28, are configured to receive the potentially impeded signals and transmit the signals to other sensors 22 or to the base station 22.

In one arrangement, the signal repeater 23 is operable to provide communication load balancing among the sensors within the communications network 34. For example, in certain cases, the sensor in closest geographic position relative to the base station 24, such as sensor 22-7, can become inundated with reporting signals transmitted from the other sensors 22 in the network 34, causing the bandwidth of the sensor 22-7 to become saturated. As a result, the sensor 22-7 cannot efficiently deliver the reporting signals to the base station 24. In such a case, the signal repeater 23 is configured to provide direct communication between some of the sensors 22 in the network 34 and the base station 24, thereby reducing the bandwidth demands on the sensor 22-7 in closest proximity to the base station 24 and increasing the signal transmission efficiency within the network 34.

In the system 20, the base station 24 is configured to receive reporting signals 36 from the communications network 34. For example, the base station is configured as a computerized device, such as a personal computer or a laptop computer, and includes a receiving element 38 that receives the reporting signals from the sensors 22 or signal repeaters 23 within the network 34. While the receiving element 38 can receive the reporting signals in a variety of formats, in one arrangement, the receiving element 38 is configured as a wireless signal receiver that receives the reporting signals wirelessly.

Based upon characteristics of detected activity in the network 34 as indicated by the sensors 22, the base station 24 generates a reporting output to provide an alert as to suspected IED placement activity within a geographic area. For example, in the case where the base station 24 receives a reporting signal from a sensor 22 having a characteristic that indicates the presence of limited pedestrian foot traffic in proximity to the sensor 22, such as illustrated in FIG. 2B, the base station 24 would not generate a reporting output. However, in the case where the base station 24 receives a reporting signal from a sensor 22 having a characteristic that indicates the presence of possible IED emplacement activity in proximity to the sensor, such as illustrated in FIG. 2C, the base station 24 would generate a reporting output.

Figure 3:
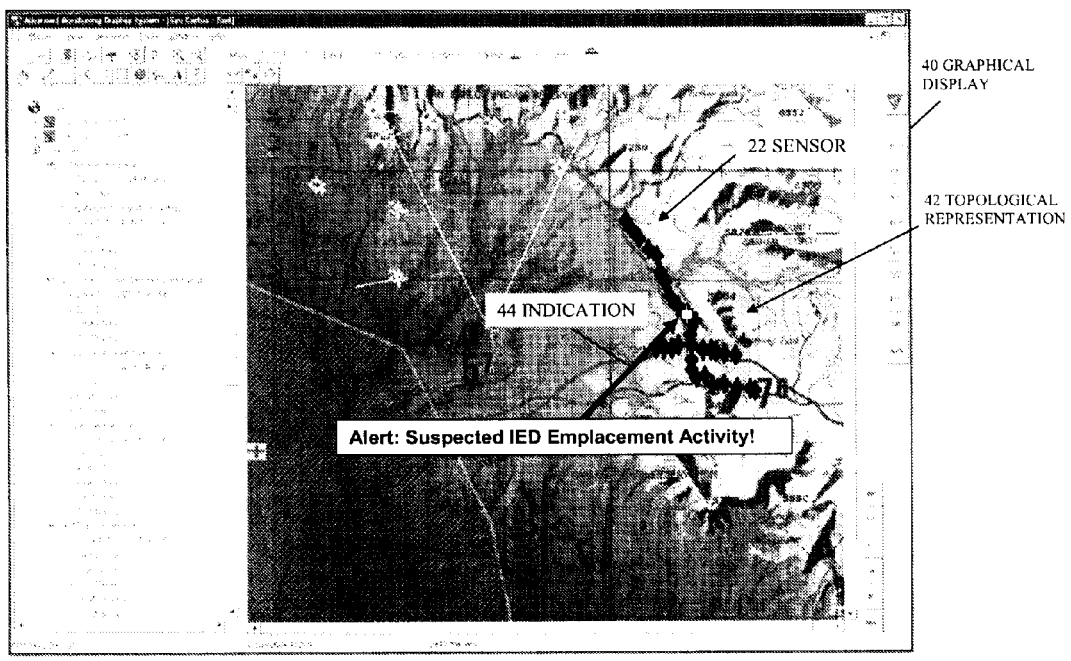
FIG. 3 illustrates an example of a graphic output produced by the base station after detecting suspected IED emplacement activity.

In one arrangement, the base station 24 provides the reporting output to a user, via an interface. In one arrangement, as indicated in FIG. 3, the base station 24 provides a graphical display 40 that shows a topologic representation 42 of a particular geographic area of concern, such as a roadway 42 and the relative locations of the sensors 22 disposed within the area. Further, the graphical display 40 provides the user with an indication 44, such as by an arrow or other indication, of a particular sensor 22 that has transmitted a reporting signal having characteristic that indicate possible IED placement activity within its vicinity.

Based upon such output 40, a base station operator can transmit alert information to appropriate response channels for investigation of the activity. Returning to FIG. 1, the base station 24 communicates with a reporting network 46, such as the Force XXI Battle Command, Brigade-and-Below (FBCB2) network, to transmit the alert information to mobile response units 50 for intervention at the activity site.

Figure 4:
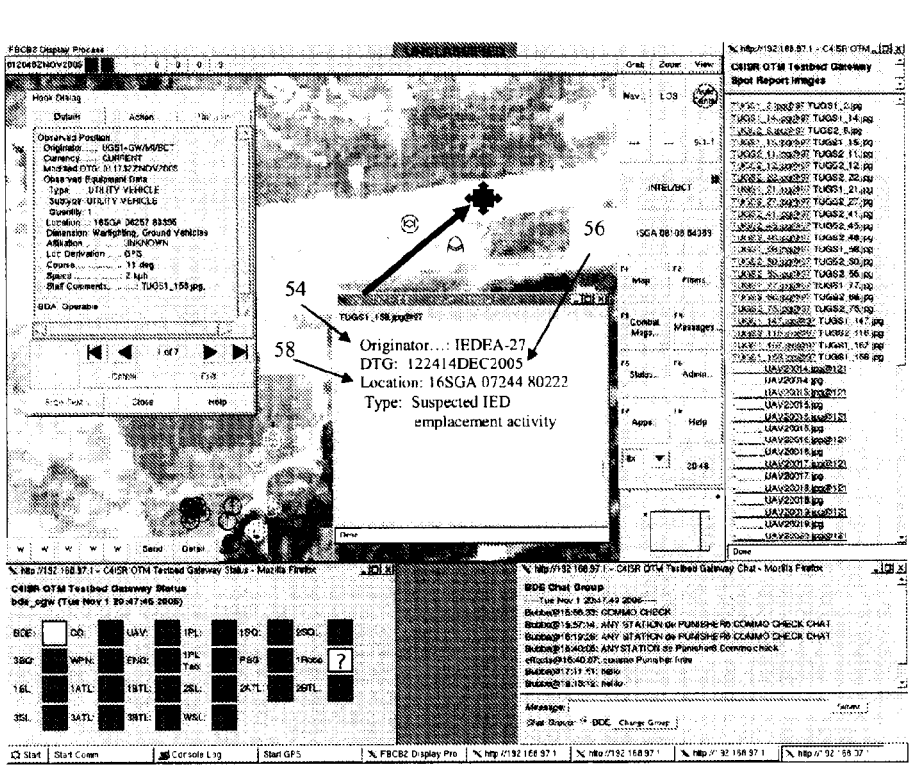
FIG. 4 illustrates an example of a graphic output produced at a mobile response unit, based upon information from a base station, to aid in locating suspected IED emplacement activity.

FIG. 4 illustrates an example of alert information 52 provided to the mobile response units 50. As illustrated, the alert information 52 provides the response units 50 with information related to the identity of the originating sensor 54, the date and time of the suspected IED placement activity 56, and the location coordinates of the sensor 58. Based on the alert information 52, the response units can take responsive action in a relatively short timeframe, relative to the detection of the suspected IED placement activity.

Figure 5:
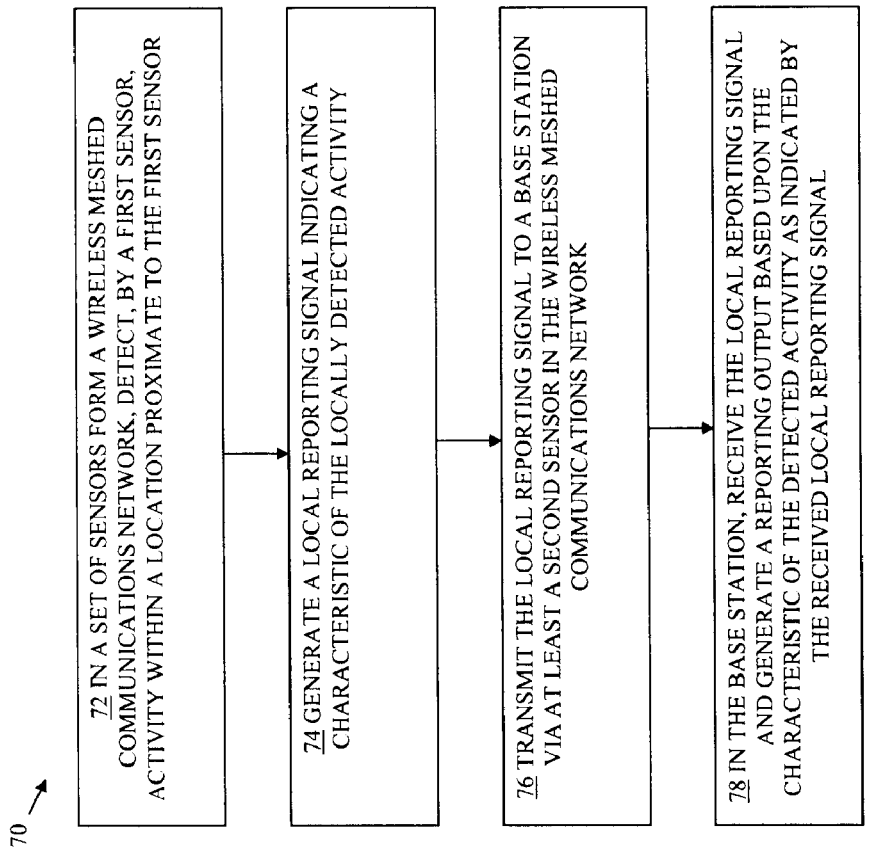
FIG. 5 is a flow chart illustrating a method performed by the system of FIG. 1 for detecting placement of explosives within a geographic area.

FIG. 5 is a flowchart 70 that illustrates the steps performed by the system 20 when detecting placement of an explosive device, such as an IED, within a geographic area.

In step 72, in a set of sensors 22 forming a wireless meshed communications network 34, a first sensor detects activity within a location proximate to the first sensor. For example, as shown in FIG. 1, the sensor 22-4 detects activity within its sensing range. Such activity can include pedestrian foot traffic, vehicular movement, or emplacement of a bomb or IED in the vicinity of the sensor 22-4.

In step 74, the first sensor generates a local reporting signal indicating a characteristic of the locally detected activity. For example, the sensor 22-4 can generate a local reporting signal that indicates a seismic characteristic of a vibration signal detected by the sensor 22-4.

In step 76, the first sensor transmits the local reporting signal to a base station 24 via at least a second sensor in the wireless meshed communications network. For example, the sensors 22 form, in one arrangement, a wireless mesh communications network 34 where each sensor 22 acts as a relay point for other neighboring sensors 22 to direct reporting signals toward the base station 24.

In step 78, the base station 24, receives the local reporting signal and generates a reporting output based upon the characteristic of the detected activity as indicated by the received local reporting signal. For example, in the case where the base station 24 receives a reporting signal from a sensor 22 having a characteristic that indicates the presence of limited pedestrian foot traffic in proximity to the sensor 22, such as illustrated in FIG. 2B, the base station 24 would not generate a reporting output. However, in the case where the base station 24 receives a reporting signal from a sensor 22 having a characteristic that indicates the presence of possible IED emplacement activity in proximity to the sensor, such as illustrated in FIG. 2C, the base station 24 would generate a reporting output.

Figure 6:
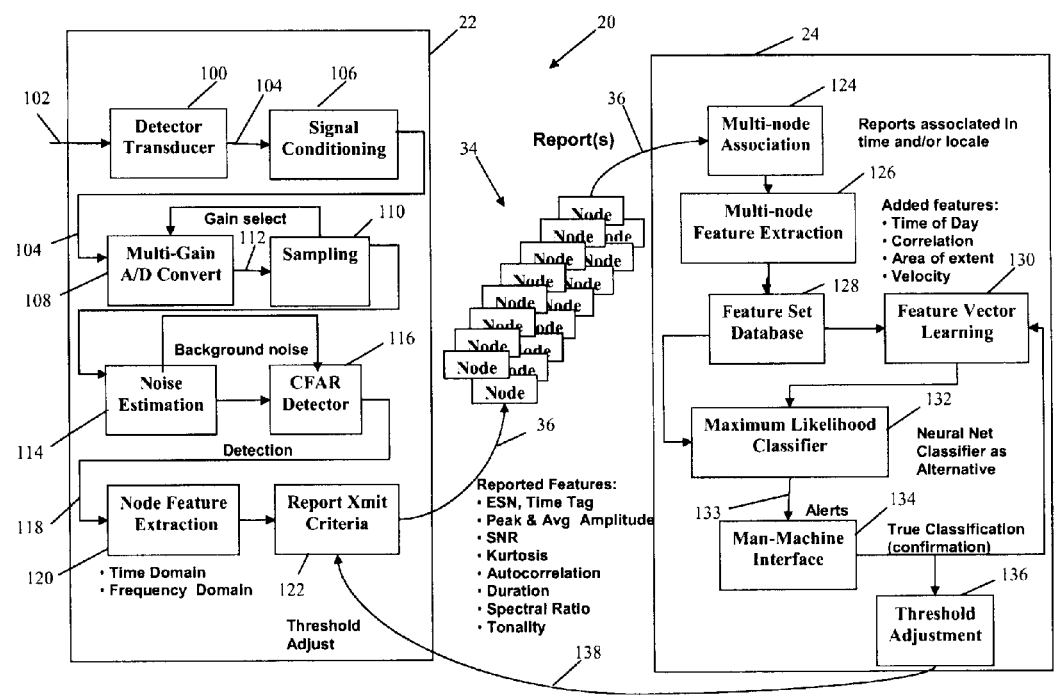
FIG. 6 illustrates a schematic representation of the collection, processing, and flow of reporting signals generated within the system of FIG. 1.

FIG. 6 illustrates a schematic representation of the overall generating, collection, processing, and use of the reporting signals within the system 20. In each sensor 22, a detector or transducer 100 receives an input 102, such as a locally detected activity, from a location in proximity to the sensor 22. For example, in the case where the sensor is configured as a seismic sensor, the transducer receives a vibration from an external source. Based upon the input, the detector 100 generates a signal 104 and transmits the signal 104 to a signal conditioning apparatus 106 which can perform an amplification or other signal processing on the signal 104. Next, the signal conditioning apparatus 106 transmits the signal 104 to an analog-to-digital (A/D) converter 108. A sampling apparatus 110 acquires digital signal samples from the A/D converter and transmits the signal to a noise estimation 114 and CFAR (Constant False Alarm Rate) detector 116 to minimize false and nuisance alarms, needless processing and radio transmissions, and wasted power.

The CFAR detector 116 transmits the resulting signal 118 to a feature extraction function 120 where the signal undergoes a detection process. The feature extraction function 120 processes the signal 118 over both the time and frequency domains to generate a reporting signal that indicates a characteristic of the input 102 received by the sensor 22. For example, the characteristics included within the reporting signal includes a time tag associated with the date and time sensor 22 received the input 102, a peak and average amplitude of the signal 118, signal to noise ratio information related to the signal, statistical information, including Kurtosis information related to the signal (e.g., Kurtosis being a statistical measure of the impulsivity of a signal, such as a heavy object being placed on the ground or shovel being driven into the ground), auto correlation information (e.g, auto-correlation being a measure of the periodicity of a signal, such as walking at a steady pace or machinery in operation), signal duration information, spectral ratio information (e.g., spectral ratio being the ratio the signal strength in one frequency band versus another, such as the signal strength in a high frequency band divided by the signal strength in a low frequency band), and tonality information (e.g., tonality being a measure of the sine wave signal strength with or without harmonics that may be observed as peaks in the frequency domain via a Fourier Transform). The sensor 22 then transmits the resulting reporting signal to the network 34 via transmitter 122

When the base station 24 receives the reporting signal 36, prior to generating or transmitting an alert message indicating suspected IED emplacement activity within a particular geographic area, the base station 24 performs an analysis of the reporting signal 36 which takes into account various factors associated with the signal 36. In one arrangement, after the base station 24 receives reporting signals 36 from the network, a multi-node association function 124 reviews time or locale information associated with the signals 36 indicative of IED emplacement activity. For example, the multi-node association function 124 analyzes sequential reporting signals received from a single sensor 22 to characterize the detected activity. Assume the base station 24 receives multiple, sequential reporting signals 36 from a sensor 22 where each reporting signal includes characteristics that indicate IED emplacement activity. In such a case, the base station 24 can detect that there is a high probability of IED emplacement activity in proximity to the sensor 22 and can generate an alert message. Such analysis minimizes the base station 24 from generating and transmitting nuisance or false alert messages.

The base station also includes a multi-node feature extraction function 126 which also analyzes the reporting signal 36 and takes into account various factors associated with the signal 36 prior to generating or transmitting an alert message. In one arrangement, the function 126 analyzes the time at which the sensor 22 generated the reporting signal 36 to detect the probability that the reporting signal 36 indicates IED emplacement activity. For example, a reporting signal 36 transmitted during the day can indicate a low probability of IED emplacement activity while a reporting signal 36 transmitted during the night can indicate a high probability of IED emplacement activity.

In another arrangement, the function 126 correlates signals 36, generated by sensors 22 within the network 34 (e.g., both local reporting signals and remote reporting signals) to detect the probability that the reporting signals 36 indicate IED emplacement activity. For example, if the base station 24 receives multiple reporting signals 36 from multiple sensors 22 over a relatively short time frame, the function 126 can compare the signals 36 from the multiple sensors to detect whether the signals 24 are indicative of transient activity, such as a vehicle or personnel passing by the sensors 22, or IED emplacement activity. In yet another arrangement, the function 126 detects the geographic area from which the reporting signals 36 are transmitted or the velocity of apparent sensor-to-sensor movement of detected activity among sensors 22 to detect the probability that the reporting signals 36 indicate IED emplacement activity.

The base station 24 also includes additional elements used to analyze the reporting signals 36 prior to generating or transmitting an alert message. For example, the base station includes a feature set data base 128, a feature vector learning function 130, and a maximum likelihood classifier function 132. As indicated above, the reporting signals 36 include characteristics of the input 102 received by the sensors 22. The maximum likelihood classifier function 132 compares the characteristics included in the reporting signals 36 with characteristics stored in the feature set data base 128 that indicate IED emplacement activity. In the event the maximum likelihood classifier function 132 detects a match between the characteristics of the reporting signal and one or more characteristics stored in the feature set data base 128, thereby indicating probable IED emplacement activity, the base station 24 provides an alert message 133 to a base station interface 134. Additionally, the feature learning vector function 130 is used to improve the performance of the system 20. When an observed feature vector (e.g., a set of observed features from a particular encounter) is confirmed by an outside source as being either IED emplacement activity or some other activity, then the feature vector associated with the true classification (e.g., the IED emplacement activity) is added to the data base in the feature learning vector function 130. The maximum likelihood classifier function 132 can then utilize the updated information in the feature learning vector function 130, thereby improving future performance based on past data.

As indicated above, the sensors 22 are configured to communicate with the base station 24 via the wireless network 34. In one arrangement, the base station 24 is configured to communicate with the sensors 22 via the network 34 and can transmit programming information to each of the sensors 22 to adjust operation parameters of the sensors 22. As illustrated in FIG. 6, the base station 24 includes a threshold adjustment mechanism 136 configured to transmit a signal 138 to one or more sensors 22 to adjust a detection threshold of the sensors 22. For example, assume the detection threshold of a sensor 22 was set such that any activity in proximity to the sensor 22 (e.g., pedestrian foot traffic, vehicular traffic) would cause the sensors 22 to transmit a reporting signal that included characteristics indicating possible IED placement activity. In such a case, the base station 24 can remotely reconfigure the detection threshold sensors 22 via the signal 138 to decrease the detection sensitivity of the sensor 22. In another example, the base station 24 can adjust the detection threshold of the sensors 22 during expected high activity periods such as during relatively quiet times (e.g. late night).

Figures 7A, 7B:
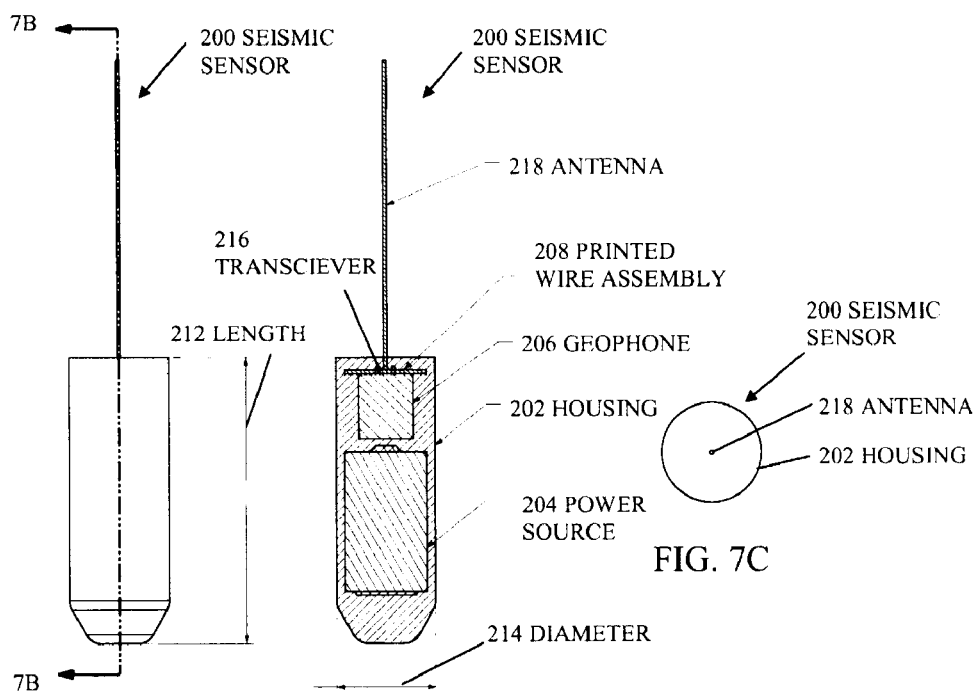
FIG. 7A illustrates a side view of a seismic sensor for use in the system of FIG. 1, according to one embodiment of the invention.
FIG. 7B illustrates a sectional view of the seismic sensor of FIG. 7A.

As indicated above, in one arrangement the sensor 22 are configured as seismic sensors that detects local vibrations and transmits the information to the base station 24. FIGS. 7A-7C illustrate an example of a seismic sensor 200 for use by embodiments of the system 20 where the seismic sensor 200 includes a housing 202 that contains a portable power source 204, an activity detection mechanism such as a geophone 206, and a printed wire assembly 208. Generally, the seismic sensor 200 is configured to provide automated discrimination of heavy object emplacement, such as IED's (e.g., the vibration characteristics of which are illustrated in FIG. 2C) versus other activity (e.g., the vibration characteristics of pedestrian foot traffic as illustrated in FIG. 2B). The seismic sensor 200 also requires relatively low communications bandwidth needs, requires small amounts of power during operation, thereby allowing relatively long term powering via the portable power source 204, and has a relatively low manufacturing cost.

The housing 202 provides physical support to the portable power source 204, geophone 206, and printed wire assembly 208 and maintain electrical communication among these elements. In one arrangement, the housing 202 encases the portable power source 204, geophone 206, and printed wire assembly 208 to protect the elements from elemental factors when disposed within a network 34. For example, the housing can be formed from a molded plastic material and can include a non-reflective surface finish to minimize visual detection. Also, the size of the housing is configured to allow portability and minimize visual detection of the sensor 200. For example, the housing 202 is configured in a substantially tubular shape, having a length 212 between approximately 3 inches and 5 inches and having a diameter 214 between approximately 1 inch and 3 inches.

The portable power source 204 is configured to provide power to one or both of the geophone 206 and printed wire assembly 208. In one arrangement, the portable power source is configured as a battery, such as a lithium battery. In use, the geophone 206 and printed wire assembly 208 sensors 22 remain active over the life of the power source 204. However, because these components require a relatively small amount of power to operate, the portable power source 204 provides an energy capacity for a duration of at least one year to the elements 206, 208.

The geophone 206 is configured to receive an input vibration, such as caused by emplacement of an IED in proximity to the sensor 22, and generate an output signal corresponding to the input vibration. For example, the geophone 206 includes a magnetic shaft surrounded by a wire coil. The input vibration causes the shaft to move relative to the coil to induce a current within the coil which is then transmitted to the printed wire assembly 202. In one arrangement, the geophone is a GS-20DM geophone distributed by GeoSpace Technologies (7007 Pinemont, Houston, Tex.).

The printed wire assembly 208 is configured to transmit the signal from the geophone 206 to the network 34 and to receive external signals from other sensors in the network 34. For example, the printed wire assembly 208 includes a transceiver 216, such as a low-power radio frequency transceiver, operable to transmit reporting signals to the network 34. While the transceiver 216 can transmit the signals to the network 34 at any rate, in one embodiment, the transceiver 216 transmits the signals at a data rate of approximately 256 kilobytes per second. In one arrangement, the transceiver 216 is a CC2420 RF transceiver distributed by Chipcon AS (Gaustadalléen 21, NO-0349 Oslo, Norway).

The transceiver, in one arrangement, includes an antenna 218 that extends from the housing 202 of the sensor 200 and aids in the transmission and reception of reporting signals from the sensors in the network 34 and the reception of programming instructions from the base station 24. In use, when the sensor 200 is implanted within the ground near a roadside, for example, the antenna 218 is configured to extend above ground level to transmit and receive reporting signals within the network 34. As a result, the antenna 218 can be configured in a number of ways to minimize visual detection. For example, the antenna 218 is configured as a hair wire having a minimal diameter and/or as having a non-reflective coating that limits visual detection.

Figure 8:
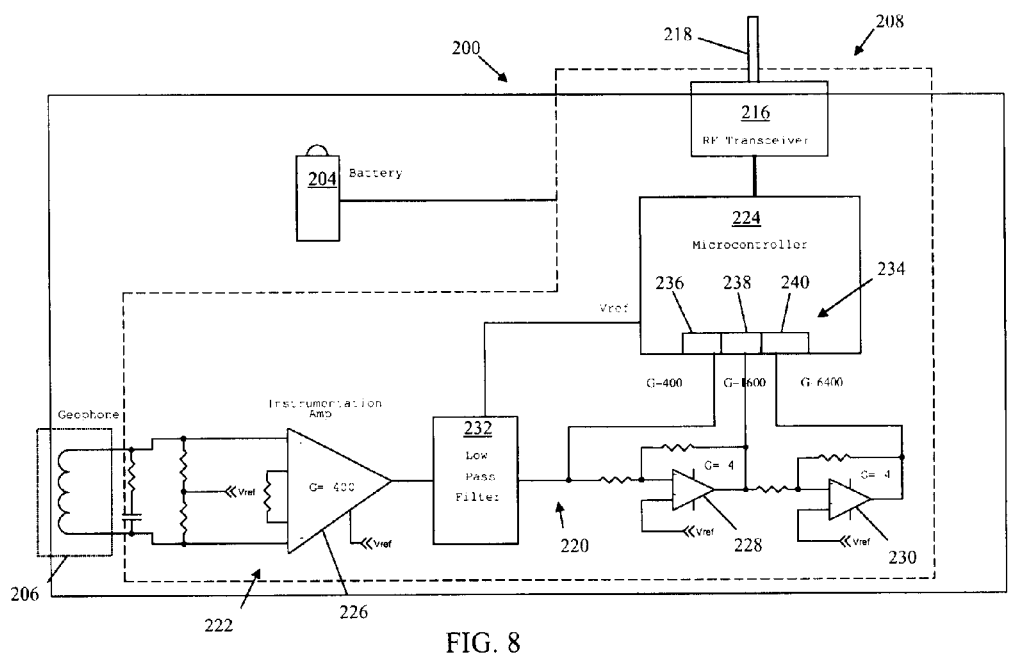
FIG. 8 illustrates a schematic representation of an embodiment of the seismic sensor of FIGS. 7A-7C.

FIG. 8 illustrates a schematic representation of an embodiment of the seismic sensor 200 where the printed wire assembly 208 includes processing circuitry 220 that includes an amplification assembly 222 electrically coupled to the geophone 206 and a controller 224 electrically coupled to the amplification assembly 222. The amplification assembly 222 is configured to receive a low amplitude signal generated by the geophone 206 and amplify the signal. The controller 224 is configured to receive the amplified signal from the amplification assembly 222 through an A/D converter 234 and, based upon the amplified signal, generate a reporting signal.

In one arrangement, the controller 224 is a low power microcontroller, such as microcontroller MSP430F1611 distributed by Texas Instruments Incorporated (12500 TI Boulevard, Dallas, Tex.) having an A/D converter 240 that includes multiple input channels. For example, the controller 224 can include a three channel, 12-bit, 256 Hz analog-to-digital converter 234 having channels 236, 238, and 240, where each channel is configured to receive an amplified signal from the amplification assembly 222. In such an arrangement, the amplification assembly 222 includes a first amplifier 226, a second amplifier 228, and a third amplifier 230 which deliver separately amplified signals to each channel 236, 238, and 240 of the controller 224.

In use, the first amplifier 226 receives a signal from the geophone 206 and amplifies the signal using a gain factor, such as a gain of 400 for example. The first amplifier 226 transmits the signal to a low pass filter 232, such as a filter that attenuates frequencies in the amplified signal above approximately 100 Hz. The filter 232 splits the amplified signal and transmits a portion of the signal to the first A/D converter channel 236 and a portion to the second amplifier 228. The second amplifier 228 amplifies the signal using a gain factor, such as a gain of 4 for example, to generate a signal having a total gain of 1600. The second amplifier 228 then splits the amplified signal and transmits a portion of the signal to the second A/D converter channel 238 and a portion to the third amplifier 230. The third amplifier 230 amplifies the signal using a gain factor, such as a gain of 4 for example, to generate a signal having a total gain of 6400 and transmits the signal to the third A/D converter channel 240. Each channel 236, 238, 240 receives the output signal from the geophone 206 at a different gain. Based on the signal amplitude, the controller 224 selects at least one amplified signal from the channels 236, 238, 240 for generation of the reporting signal.

Figure 9:
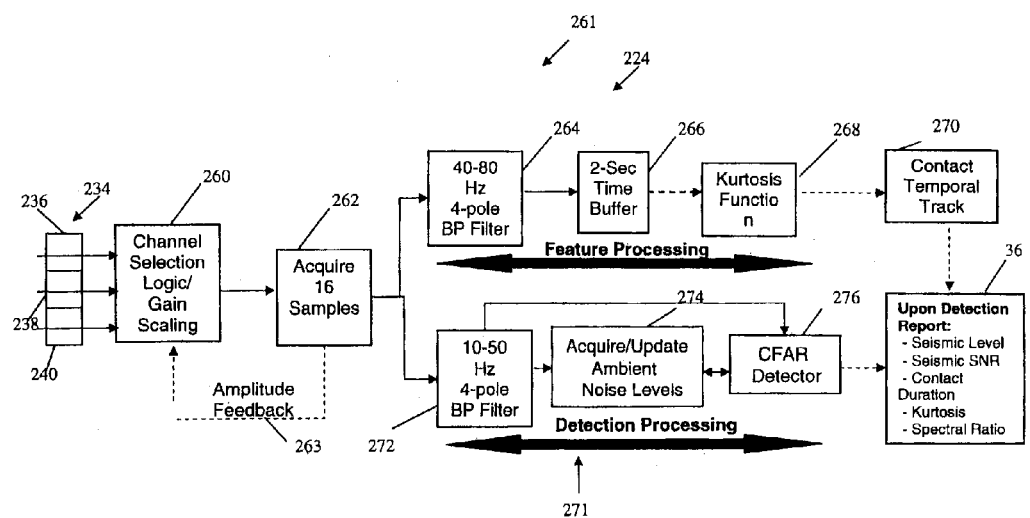
FIG. 9 illustrates a configuration of the controller for processing a signal from input channels and for generation of the reporting signal.

FIG. 9 illustrates a configuration of the controller 224 for processing of a signal from the channels 236, 238, 240 and for generation of the reporting signal. As illustrated, the controller includes channel selection logic 260 and a sample acquiring function 262. The channel selection logic 260 transmits a signal from one of the channels 236, 238, 240 to the sample acquiring function 262 and selects a particular channel based on an amplitude signal range of the amplified geophone signal. For example, assume the channel selection logic 260 transmits the signal from the second channel 238 to the sample acquiring function 262. If the amplitude of the signal from the selected channel is larger or smaller than a particular amplitude signal range, the sampling function 262 provides feedback 263 to the channel selection logic 260, thereby causing the channel selection logic 260 to select one of the other channels (e.g., 236, 240) and transmits the signal from the newly selected channel to the sample acquiring function 262. The sample acquiring function 262, in turn, acquires samples of the corresponding signal.

The sample acquiring function 262 acquires 16 sample blocks for further processing. The sample acquiring function 262 transmits the sample blocks to a detection processing function 271 to compare the sample blocks against ambient noise levels. For example, the sensor 200 monitors and computes background noise over a long time frame (e.g., much longer than an expected encounter) in a substantially continuous manner. In use, the sample acquiring function 262 transmits the 16 sample blocks to a filter 272, such as a 10-50 Hz bandpass filter 272. The resulting signal is compared against updated ambient noise levels within function 274, and further processed by a CFAR detector 276. When the environment is very noisy, the CFAR detector 276 automatically adjusts the sensor's 200 detection thresholds to be less sensitive and, when background noise is less noisy, automatically adjusts the sensor's 200 detection thresholds to be more sensitive.

The sampling function 262 also transmits the sample blocks to a feature processing function 261 to form a reporting signal. For example, the sampling function 262 transmits the sample blocks to a filter 264, such as a 40-80 Hz bandpass filter 264. The filter 264 transmits the resulting signal to a signal buffer 266, such as a 2 second signal buffer. The Kurtosis function 268 performs a Kurtosis analysis on the buffered signal. The Contact Temporal Track function 270 then associates activity from one sample, in this case, a sample 2 seconds long, to succeeding samples (e.g., a person walking past the transducer over a period of many seconds) to detect the nature of the activity. As a result of the processing, the controller 224 generates a reporting signal that indicates a characteristic, such a seismic characteristic associated with the input (e.g., input signal) received by the geophone 206. For example, the reporting signal can include a peak amplitude or level of the input signal, a signal to noise ratio of the input signal, duration of the input signal, Kurtosis of the vibration signal, and a spectral ratio of the input signal, as described above.

While this invention has been particularly shown and described with references to preferred embodiments thereof, it will be understood by those skilled in the art that various changes in form and details may be made therein without departing from the spirit and scope of the invention as defined by the appended claims.

For example, as illustrated in FIG. 1, the communications network 34 includes eight sensors 221 through 22-8 that provide IED or explosive device emplacement detection within a geographic area. Such illustration is by way of example only. In one arrangement, the communications network 34 can include any number of sensors to provide emplacement detection over a relatively large geographic area. For example, in the case where the sensors 22 form a mesh network, up to 64,000 sensors can be disposed within a geographic area for IED emplacement detection.

For example, as described above, in one embodiment, the sensors in the system are configured as seismic sensors. Such description is by way of example only. In one arrangement, the sensors can be configured as other types of activity detectors as well. For example, the sensors can be configured as visual or thermal video sensors, infrared thermal sensors, acoustic sensors, radar devices, magnetic sensors, or MEMS accelerometers.

As indicated above, the system 20 is formed of sensors, such as seismic sensors, to detect activity within a geographic area. In one embodiment, the system includes different types of sensors used in conjunction with each other to detect activity within a geographic area. For example, the system 20 can use any combination of activity detectors described above.

As indicated above, the transceivers are configured with a communications protocol, such as the IEEE 802.15.4 protocol or the ZigBee protocol that defines a relatively inexpensive self-forming, self-healing, multi-hop, network. Such description is by way of example only. In one arrangement, the transceivers are configured to communicate using any number of ad hoc, self forming, self healing, multi-hop, low cost, low power, network schemes. For example, the transceivers are configured to communicate via Millenial Net MeshScape, Dust SmartMesh, Crossbow XMesh, ITT Meshnet, Z-wave, or Bluetooth protocols. Also as indicated above, the transceiver communication protocol defines a relatively inexpensive self-forming, self-healing, multi-hop, mesh network. The mesh network, however, can alternately be configured in a star or cluster/tree configuration.

As described above, the system includes sensors, such as seismic sensors so detect activity in a geographic area. In one arrangement, the system 20 includes visual detectors used in conjunction with the sensors. For example, the system 20 can include cameras, such as pan-tilt cameras mounted on poles within the system 20. Upon detection of activity in proximity to a sensor, the sensor can transmit a signal to the visual detector thereby causing the detector to record or transmit a visual identification of the activity in the vicinity of the sensor. Alternately, the camera can be activated by the base station 24, in response to a reporting signal received by the base station 24 from the sensor.

What is claimed is:

1. A system for detecting placement of an explosive device within a geographic area, the system comprising:
    a set of sensors forming a communications network, each sensor being configured to detect activity within a location proximate to the sensor and to generate a local reporting signal indicating a characteristic of the locally detected activity and each sensor having a transceiver configured to (i) receive a remote reporting signal from other sensors of the network, the remote reporting signal indicating a characteristic of the remotely detected activity and (ii) transmit at least one of the local reporting signal and the remote reporting signal to other sensors of the network;
    a base station configured to receive at least one of the local reporting signal and the remote reporting signal from the communications network and generate a reporting output based upon the characteristic of the detected activity as indicated by the received reporting signal when the characteristic of the detected activity is indicative of an activity associated with placement of the explosive device within the geographic area; and
    a signal repeater configured to receive at least one of the local reporting signal and the remote reporting signal from a first sensor in the communications network and transmit the at least one of the local reporting signal and the remote reporting signal to one of a second sensor in the communications network and the base station;
    wherein the signal repeater is operable to selectively transmit at least one of the local reporting signal and the remote reporting signal to selected sensors within the communications network to provide communication load balancing among the sensors within the communications network;
    wherein each sensor is operable to transmit at least one of the local reporting signal and the remote reporting signal to a subset of sensors within the communications network, the subset of sensors being fewer than the set of sensors forming the communications network.

2. The system of claim 1, wherein each sensor is operable to transmit at least one of the local reporting signal and the remote reporting signal to the subset of sensors within the communications network disposed in geographic proximity thereto.

3. The system of claim 1, wherein each sensor is operable to receive remote reporting signals from a subset of sensors within the communications network, the subset of sensors being fewer than the set of sensors forming the communications network.

4. The system of claim 3, wherein each sensor is operable to receive remote reporting signals from a subset of sensors disposed in geographic proximity thereto.

5. The system of claim 1, wherein the reporting output comprises a graphical output showing a representation of the geographic area and a location of a sensor generating at least one of the local reporting signal and the remote reporting signal.

6. The system of claim 1, wherein the base station is configured to analyze sequential local reporting signals received from a sensor to characterize the detected activity.

7. The system of claim 1, wherein the base station configured to analyze a local reporting signal and a remote reporting signal received from the communications network to characterize the detected activity.

8. The system of claim 1, wherein the base station is configured to adjust a detection threshold associated with at least one sensor of the set of sensors to adjust a detection sensitivity of the at least one sensor.

9. The system of claim 1, wherein at least one sensor of the set of sensors comprises a seismic sensor.

10. The system of claim 9, wherein the local reporting signal indicates a seismic characteristic associated with a vibration detected by the sensor, the seismic characteristic selected from a group consisting of: a peak amplitude of the vibration signal, a signal to noise ratio of the vibration signal, a duration of the vibration signal, kurtosis of the vibration signal, and a spectral ratio of the vibration signal.

11. The system of claim 1, wherein the set of sensors form a wireless communications network.

12. The system of claim 11, wherein the set of sensors form a wireless mesh network that provides self-forming, self-healing, multi-hop connections among the sensors of the network.

13. The system of claim 1, wherein the base station is configured to perform an analysis of the at least one of the local reporting signal and the remote reporting signal to account for at least one of a time factor and a location factor associated with the at least one of the local reporting signal and the remote reporting signal prior to generating the reporting output.

14. A system for detecting explosive apparatus emplacement, the system comprising:
    a base station; and
    remote seismic sensing devices configured to communicate with the base station in a wireless manner, the remote seismic sensing devices being further configured to self-form a wireless communications network having multiple communications pathways from the remote seismic sensing devices to the base station;
    wherein the base station includes an interface to a user of the system and is configured to identify an explosive apparatus emplacement event to the user via the interface based on seismic information from the remote seismic sensing devices;
    wherein the base station is configured to evaluate predetermined characteristics of the seismic information tending to distinguish the explosive apparatus emplacement event from other events;
    wherein each seismic sensing device is operable to transmit at least one of a local reporting signal and a remote reporting signal to a subset of seismic sensing device within the communications network, the subset of seismic sensing device being fewer than the set of seismic sensing device forming the communications network.

15. A system as in claim 14 wherein the predetermined characteristics include impulsivity, aperiodicity, amplitude, and concentration at a small number of adjacent sensors.

* * * * *